May 27, 1930. K. E. PEILER 1,760,255
COOLING MECHANISM FOR GLASS FEEDER SHEAR BLADES
Filed Jan. 15, 1929 2 Sheets-Sheet 1

Witness
Winslow B. Thayer.

Inventor:
Karl E. Peiler,
by Rohm & Binn
Attorney

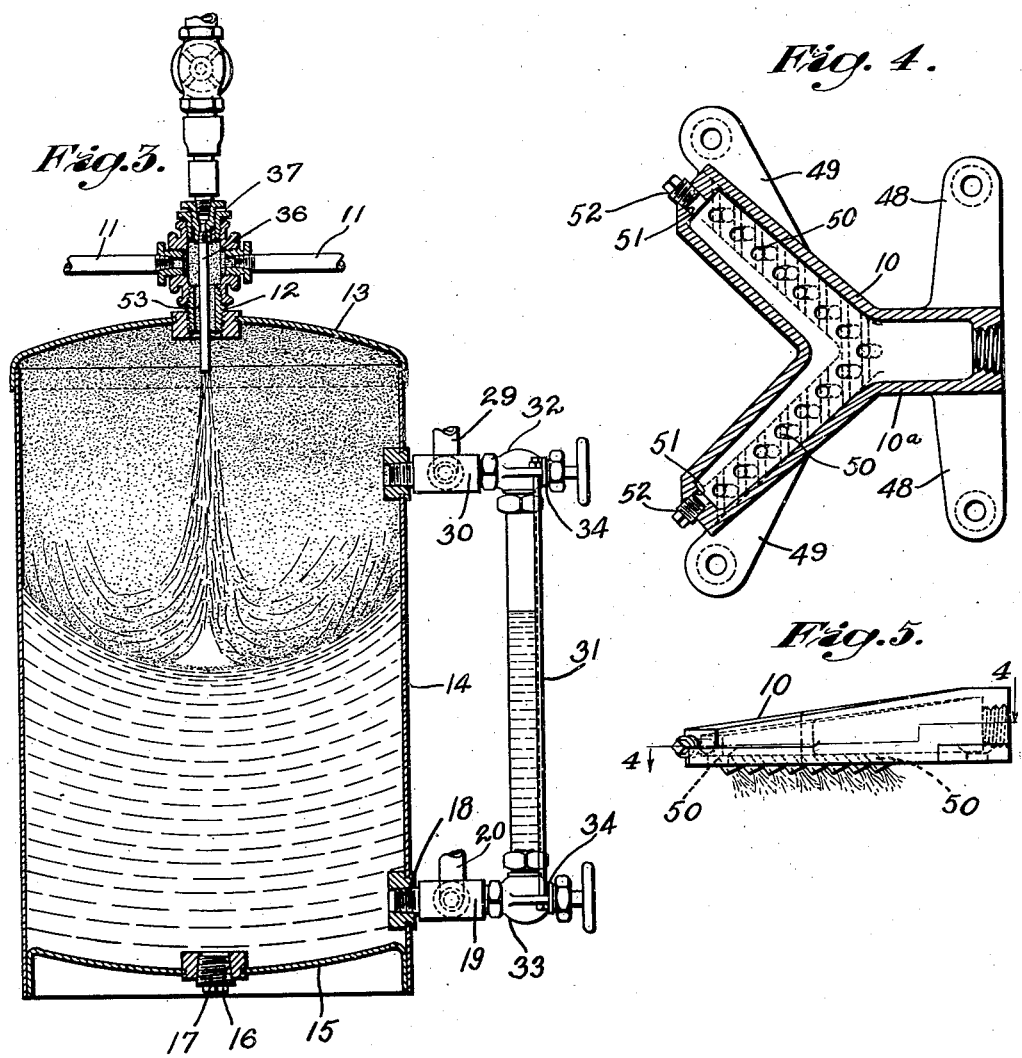

Patented May 27, 1930

1,760,255

UNITED STATES PATENT OFFICE

KARL E. PEILER, OF WEST HARTFORD, CONNECTICUT, ASSIGNOR TO HARTFORD-EMPIRE COMPANY, OF HARTFORD, CONNECTICUT, A CORPORATION OF DELAWARE

COOLING MECHANISM FOR GLASS-FEEDER SHEAR BLADES

Application filed January 15, 1929. Serial No. 332,649.

My invention relates to the cooling and lubrication of the shear blades of glass feeders.

An object of the invention is to provide an improved mechanism for cooling the cooperative shear blades of a glass feeder uniformly and thoroughly without interfering with the normal operation of the shear blades or of any other part of the associated feeder.

A further object of the invention is to provide a mechanism having a pair of spray heads adapted to discharge cooling and lubricating fluid, such as moistened air, onto the shear blades of a feeder when the shear blades are in their opened or retracted positions and in such manner that the working surfaces of the shear blades are uniformly cooled and lubricated without any of the cooling and lubricating substance being deflected or projected onto the glass that is discharging from or accumulating in suspension below the outlet of the feeder.

Figure 1:
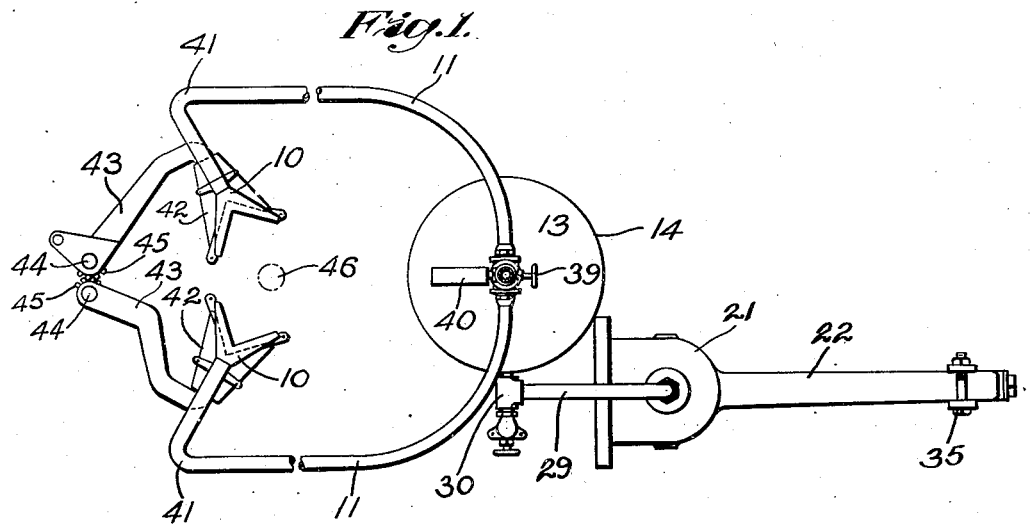
Figure 2:
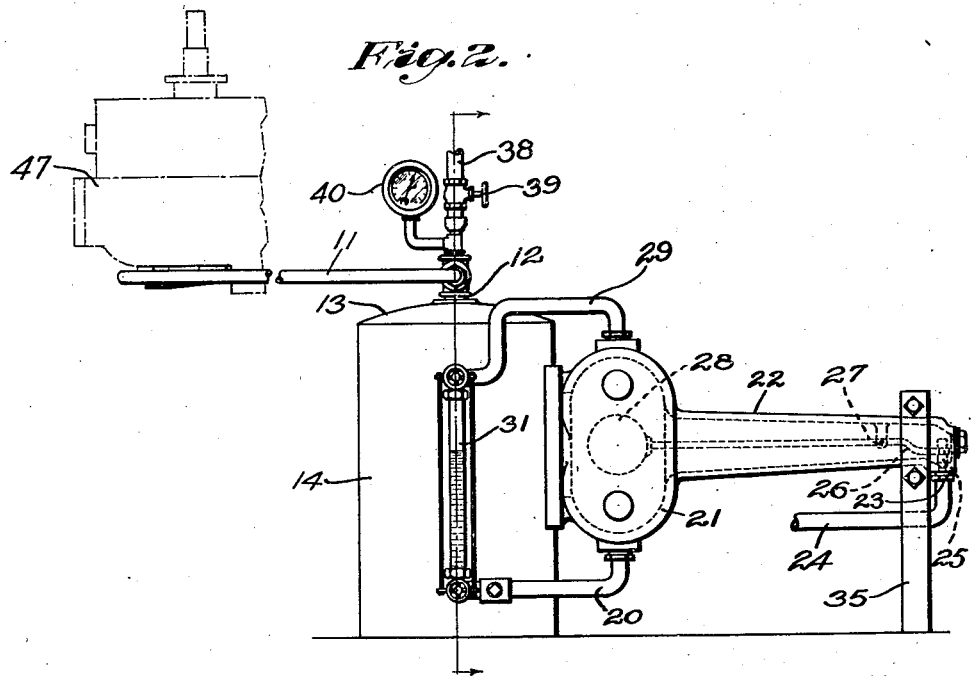

Other objects of the invention will be apparent from the following description, when it is considered in conjunction with the accompanying drawings, forming a part of this application, in which:

Fig. 1 is a plan view of a spray mechanism embodying the invention in position to discharge cooling and lubricating fluid onto a pair of retracted shear blades of a glass feeder, the view showing also the relation of the spray heads of the spraying mechanism to the discharge outlet of the feeder, Fig. 2 is a side elevation of the spray mechanism shown in Fig. 1, with the shear blades omitted, and with a portion of the feeder forehearth or glass feeding container shown more or less diagrammatically by dot and dash lines, Fig. 3 is a vertical section through the atomizing or air moistening tank of the spray mechanism, showing in elevation certain parts which are appurtenant to the tank, Fig. 4 is a horizontal section on an enlarged scale through one of the spray heads, the view being taken substantially along the line 4—4 of Fig. 5, and Fig. 5 is a side elevation of the spray head shown in Fig. 4.

The improved spray mechanism comprises a pair of spray heads 10 which are connected by similar spray conducting pipes 11 to opposite sides of a vertically disposed spray discharge outlet pipe 12 which is located at the center of the top 13 of a vertically disposed preferably cylindrical atomizing or air moistening tank 14 (Fig. 3). The tank 14 has a bottom 15 which may slope from its juncture with the side walls of the tank toward a central opening 16 that is normally closed by a plug 17. The plug 17 can be removed when required to permit the draining of the tank 14 and the removal of any sediment which may have accumulated therein.

The tank 14 is provided adjacent to its lower end with a lateral liquid inlet opening 18. A liquid supply mechanism may comprise the pipe 19 which has a portion screwed into the inlet opening 18 and a pipe 20 which connects the pipe 19 with the bottom of a float chamber 21. The float chamber 21 has a lateral hollow extension 22 which is connected adjacent to the bottom of its outer end, as at 23, Fig. 2, with a pipe 24 which may lead from any convenient source of supply of a suitable liquid, which may be water or oil. Thus, it will be apparent that liquid tends to flow from the pipe 24 through the extension 22 into the float chamber 21 and thence through the pipes 20 and 19 into the tank 14. In order that a predetermined level of liquid may be constantly maintained in the tank 14, the extension 22 of the float chamber may be provided at or adjacent to its juncture with the pipe 24 with a seat for a valve 25. The valve 25 is carried at one end of a lever 26 which is fulcrumed at 27 within the extension 22 of the float chamber and is provided at its other end with a float 28 which rises and falls with the level of liquid within the float chamber and consequently with the level of liquid within the tank 14. The arrangement is such that the valve 25 will be closed and will prevent the admission of further liquid into the extension 22 of the float chamber and thence through the float chamber into the tank 14 when the liquid in the tank 14 is at the desired level. When the level of the liquid within the tank 14 falls, the level of liquid within the float chamber falls correspondingly and the valve 25 is opened to permit the admission of liquid sufficient to bring the liquid within the tank up to the desired level.

The upper part of the float chamber has communication with the space within the tank 14 above the level of the liquid in the latter through the pipes 29, Figs. 1 and 2, and 30, Figs. 1 and 3, so that the pressures above the liquid levels in the tank and float chamber, respectively, will be substantially equalized.

The tank preferably is provided with a liquid gauge tube or level indicator 31 which may conveniently be connected at its upper end with the pressure equalizing member 30, as by means of the pipe fitting 32, and at its lower end by a similar pipe fitting 33 with the liquid supply pipe 19. The pipe fittings 32 and 33 may be provided with suitable valves 34 so that communication between the upper and lower ends of the gauge tube and the interior of the tank may be closed when desired and the gauge tube thus rendered temporarily inactive.

The extension 22 of the float chamber 21 may be stayed or supported in any suitable known manner, as by means of the supporting structure 35.

Referring now particularly to Fig. 3, it will be noted that a supply pipe or nozzle 36 for discharging compressed air downwardly into the tank may depend centrally through the spray discharge outlet 12 in spaced relation to the inner walls of the latter into the tank 14 and may be disposed centrally or axially of the latter. The air supply pipe 36 terminates above the level of the liquid in the tank 14 and is supported at the upper end of the member 12 by a suitable packing gland or stuffing box arrangement 37, whereby it is connected with a supply pipe 38 which may lead from any convenient source of supply of compressed air. The air supply pipe 38 may be provided with a valve 39 for controlling the passage of compressed air from the source of supply to regulate the pressure at which the air is discharged downwardly into the tank 14 and also may be provided below the valve 39 with a conventional pressure gauge, such as indicated at 40 in Fig. 2.

The spray discharge members 11 preferably are of equal length and are bent in a substantially horizontal plane angularly toward each other and rearwardly as indicated at 41 in Fig. 1 so that the respective spray heads 10 will be disposed above and slightly in advance of the shear blades 42 when such shear blades are in their opened or retracted positions, as shown in Fig. 1. The shear blades 42 may be carried by the pivoted shear arms 43 which are mounted on the vertical pivot elements 44 and are provided with enmeshed segmental gears 45 so that a swinging motion of one of the shear arms 43 about the axis of its pivot 44 will cause a swinging motion of the other shear arm either toward or away from the first shear arm, according to the direction of swinging movement of the latter. In practice the shear arms 43 are periodically actuated simultaneously to move the shear blades 42 to closed or overlapping relation to sever molten glass below and axially of the outlet 46. Fig. 1, of a glass feeding container or forehearth, such as partially shown in a more or less diagrammatic manner at 47 in Fig. 2. The shear blades are periodically opened or retracted after such glass severing operations. The shear blades and the shear supporting and operating mechanism as well as the portion of the glass feeding forehearth or container, shown in the drawings, are substantially as included in the well-known Hartford-Empire single feeder, a disclosure of which may be found in British Patent 227,079 of Aug. 27, 1925. The shear blades 42 preferably are V shaped as shown and each spray head 10 therefore preferably is also V shaped and is supported by its supply pipe 11 so that the respective branches of such spray head will extend substantially parallel with the corresponding branches or portions of associated V shaped shear blade and slightly above and forwardly of the latter as shown in Fig. 1. Each V shaped spray head includes a stem portion 10$^a$ which is connected with the associated pipe 11 and the stem 10$^a$ and the branches of each spray head 10 may be provided with lateral lugs 48 and 49, respectively, Fig. 4, which are apertured for the reception of suitable fastening devices for securing the spray head in the desired position with respect to the associated retracted shear blade. Each spray head is provided in its bottom with downwardly and rearwardly inclined discharge orifices 50 and preferably is provided at its extremities with the drain openings 51 which normally are closed by the plugs 52.

The operation of the improved spray mechanism is substantially as follows:

Compressed air from the air supply nozzle 36 will enter the tank 14 and be projected downwardly centrally of the latter at a sufficiently high velocity to violently agitate the surface portion of the liquid within the tank. The downwardly moving blast of air from the pipe 36 may create a vortex or at least a central depression or cavity within the liquid within the tank 14. The air from the nozzle 36 on striking the liquid in the tank will be deflected outwardly and upwardly in intimate contact with the violently agitated liquid at the surface of the liquid within the tank and thus will be thoroughly moistened by such liquid. The moistened air or atomized liquid will pass upwardly to the top of the tank and into the annular discharge passage 53 through the member 12 surrounding the pipe 36 and thence through the spray delivery pipes 11 to the discharge heads 10, which will discharge through the orifices 50 in downwardly and rearwardly directed substantially U-shaped streams or bodies of spray or moistened air which will strike the cutting edges and the adjacent portions of the shear blades uniformly along the entire length of the latter and then will be deflected rearwardly over the remaining portions of the retracted shear blades. The retracted shear blades will be thoroughly cooled and lubricated throughout practically their entire surfaces in the intervals between successive severing operations. The downward and outward deflection of the spray from the spray heads onto the shear blades permits the desired cooling and lubrication of the retracted shear blades without any of the spray or moistened air coming into contact with the glass that is being discharged downwardly from or is in suspension below the feeder outlet and without tending to change the temperature of the environment for the glass below the outlet.

Obviously, many changes in and adaptations and modifications of the embodiment of the invention illustrated in the accompanying drawings and hereinbefore specifically described may be made without departing from the spirit and scope of the invention, which is not to be limited except by a fair interpretation of the appended claims.

I claim as my invention:

1. In glass machinery, a discharge member adapted to discharge spray onto a glass cutting member of the glass machinery, an atomizer, and a spray conducting conduit operatively connecting said atomizer and said discharge member.

2. Spray mechanism for cooperative shear blades of glass feeding apparatus comprising a pair of spray heads adapted to discharge spray onto the shear blades when said shear blades are in their retracted positions, an atomizer, and a pair of spray conducting conduits connecting said atomizer and said discharge heads.

3. Spray mechanism for cooperative shear blades of glass feeding apparatus comprising a pair of spray heads adapted to discharge spray onto the shear blades when said shear blades are in their retracted positions, an atomizer, and a pair of spray conducting conduits connecting said atomizer and said discharge heads, said conduits being substantially equal in length and having substantially similar spray conducting passages.

4. Spray mechanism for a pair of cooperative pivoted shear blades of glass feeding apparatus, comprising a pair of spray heads disposed above and slightly in advance of the cutting edges of said shear blades when the shear blades are retracted and adapted to discharge spray downwardly and rearwardly onto the cutting edges and adjacent portions of said shear blades, means for producing a spray mixture of liquid and air under pressure, and means for conducting spray mixture from said producing means to said spray heads.

5. In combination with a pair of pivoted shear blades mounted and operated to close periodically beneath a glass discharge outlet of a feeder to sever glass discharged from said outlet and to move apart to retracted positions out of line with said outlet in the intervals between severing operations, of mechanism for cooling and lubricating said shear blades, comprising a pair of discharge heads, each having discharge orifices arranged in a series along a line conforming substantially to the configuration of the cutting edge of the adjacent shear blade and arranged to discharge into that shear blade, means for supplying a cooling and lubricating medium under pressure, and a pair of similar tubes for delivering said lubricating and cooling medium from said supply means to said discharge heads.

6. The combination with a pair of pivoted substantially V-shaped shear blades mounted to close periodically beneath a glass discharge outlet of a feeder to sever glass discharged from said outlet and for movement apart to retracted positions at opposite sides of the axial line of the feeder in the intervals between severing operations, of mechanism for cooling and lubricating said shear blades, comprising a pair of substantially V-shaped discharge heads, each located above and slightly in advance of a retracted shear blade so that the branches of said discharge head are substantially parallel with the corresponding branches of the associate shear blade, each discharge head having in its bottom downwardly and rearwardly directed discharge orifices spaced along said branches for discharging cooling and lubricating fluid downwardly and rearwardly onto the retracted shear blade, and means for supplying cooling and lubricating fluid under pressure to said discharge heads.

7. In spray mechanism for glass machinery, a spray head comprising a pair of divergent tubular discharge branches and a tubular stem joined to said branches at their junction, said discharge branches having substantially parallel discharge orifices in their bottoms spaced longitudinally of the branches.

8. In spray mechanism for glass machinery, a spray head comprising a pair of divergent tubular discharge branches and a tubular stem joined to said branches at their junction, said discharge branches having substantially parallel discharge orifices in their bottoms spaced longitudinally of the branches, said discharge branches also having drain openings in their outer ends, and removable closures for said drain openings.

9. In spray mechanism for glass machinery, a spray head comprising a pair of divergent tubular discharge branches and a tubular stem joined to said branches at their junction, said discharge branches having substantially parallel discharge orifices in their bottoms spaced longitudinally of the branches, said stem being adapted at its outer end for connection with a source of supply of cooling and lubricating fluid, said discharge orifices extending through the bottom of said branches in downwardly and rearwardly inclined directions and being located in vertical planes substantially parallel with the direction of flow of fluid longitudinally through the stem of said discharge head.

10. In spray mechanism for glass machinery, a spray head comprising a pair of divergent tubular discharge branches and a tubular stem joined to said branches at their junction, said discharge branches having substantially parallel discharge orifices in their bottoms spaced longitudinally of the branches, and means carried by said discharge head adapted for attachment to a fixed support to support said discharge head in position.

11. Spray mechanism for glass machinery comprising an atomizing tank having an inlet for liquid and a discharge outlet for spray, said outlet being located above the level of liquid in the tank, means entering the tank above the level of the liquid therewithin for discharging air under pressure downwardly against the liquid in the tank to agitate and atomize liquid in the tank, a substantially vertical tubular discharge member connected with said discharge outlet and closed at its upper end, a pair of symmetrically arranged substantially similar tubular members connected with said vertically disposed tubular discharge member at opposite sides of the latter, and spray heads at the outer ends of said symmetrically arranged tubular members for discharging spray onto spaced members of the glass machinery.

12. In spray mechanism for the shear blades of glass machinery, a vertically disposed substantially cylindrical atomizing tank having an inlet for liquid adjacent to its lower end and having a discharge outlet for spray located at the approximate center of the top of the tank, a tubular discharge member extending vertically from the discharge opening in the top of the tank, an air nozzle depending through said tubular discharge member into the tank and adapted for connection with a source of supply of compressed air, means for regulating the pressure at which air is discharged through said nozzle into the tank for atomizing part of the liquid therein, a pair of discharge heads for discharging spray onto said shear blades, and similar spray conducting means connecting said discharge member at the top of the tank with said spray heads.

13. In spray mechanism for the shear blades of glass machinery, a substantially vertical atomizing tank having an inlet for liquid and having substantially centrally of its top a discharge outlet for spray, automatic means for controlling the flow of liquid into the tank to maintain a predetermined level therein, a substantially vertical tubular discharge member connected with said discharge outlet, a substantially vertical air discharge nozzle depending through said tubular spray discharge member into the tank in spaced relation with the walls of said spray discharge member for projecting air under pressure downwardly against the liquid in the tank to violently agitate the upper portion of the body of the liquid in the tank and thereby to atomize a portion of such liquid, means cooperating with said air supply nozzle to close the upper end of said tubular discharge member, a pair of spray heads, and a pair of similar spray conducting conduits communicating with opposite sides of said tubular spray discharge member and arranged to deliver spray to said spray heads.

14. In spray mechanism for glass machinery, a substantially vertical atomizing tank having an inlet for liquid adjacent to its lower end and having a spray discharge outlet at its top, an air discharge nozzle depending through said spray discharge outlet in spaced relation to the walls of the latter for projecting air under pressure downwardly into the tank against the surface of the liquid in the latter, a float chamber connected with said liquid inlet and with a source of supply of liquid, pressure equalizing means connecting the float chamber and the space within the tank above the level of liquid in both said float chamber and said tank, a float in said float chamber, a valve controlled by said float for controlling the admission of liquid into the float chamber and thence into said tank, a pair of discharge heads for discharging spray on the shear blades of said glass machinery, and spray conducting means connecting said spray discharge outlet of the tank with said discharge heads.

15. In the use of glass feeding apparatus having a pair of cooperative shear blades adapted to close periodically to sever glass beneath a downwardly directed glass discharge outlet and to move apart to retracted positions at opposite sides of the axial line of said outlet in the intervals between successive severing operations, the method of cooling and lubricating said shear blades which comprises producing a supply of atomized mixture under pressure, and discharging atomized mixture from said supply onto the retracted shear blades from points located above the level of the shear blades and nearer to the axial line of said feeder outlet than the adjacent edges of the shear blades, whereby said shear blades will be cooled and lubricated in the intervals between glass severing operations without projection of spray onto glass discharging from said outlet and without appreciably altering the temperature of the environment of the discharging glass.

Signed at Hartford, Connecticut this 11th day of January, 1929.

KARL E. PEILER.